United States Patent
Jacke et al.

(10) Patent No.: US 8,501,852 B2
(45) Date of Patent: Aug. 6, 2013

(54) METHOD FOR IMPROVING THE WETTABILITY AND/OR THE ADHESIVITY OF PLASTIC SURFACES, IN PARTICULAR, TO FACILITATE PRINTING

(75) Inventors: Joachim Jacke, Paderborn (DE); Albrecht Schierholz, Schieder-Schwalenberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 238 days.

(21) Appl. No.: 12/515,829

(22) PCT Filed: Nov. 21, 2007

(86) PCT No.: PCT/EP2007/010075
§ 371 (c)(1),
(2), (4) Date: Jul. 2, 2009

(87) PCT Pub. No.: WO2008/061723
PCT Pub. Date: May 29, 2008

(65) Prior Publication Data
US 2010/0021636 A1    Jan. 28, 2010

(30) Foreign Application Priority Data
Nov. 22, 2006  (DE) .......................... 10 2006 055 384

(51) Int. Cl.
*C08K 5/10*    (2006.01)

(52) U.S. Cl.
USPC ........... 524/315; 523/160; 523/161; 524/318; 524/321

(58) Field of Classification Search
USPC ................... 524/315, 318, 321; 523/160, 161
See application file for complete search history.

(56) References Cited

U.S. PATENT DOCUMENTS

| | | | |
|---|---|---|---|
| 3,008,908 A | 11/1961 | Voigt | 260/18 |
| 3,516,956 A | 6/1970 | Reedy et al. | 260/22 |
| 5,683,817 A | 11/1997 | Kenmochi | 428/474.4 |
| 6,451,479 B1 | 9/2002 | Kim | 429/163 |
| 2004/0152806 A1* | 8/2004 | Koga et al. | 524/115 |
| 2006/0008431 A1* | 1/2006 | Farcet | 424/60 |

FOREIGN PATENT DOCUMENTS
EP    1 116 964 A2    7/2001

* cited by examiner

*Primary Examiner* — Edward Cain
(74) *Attorney, Agent, or Firm* — Woodard Emhardt Moriarty McNett & Henry LLP

(57) ABSTRACT

The invention relates to a method for improving the wettability and/or adhesivity of plastic surfaces, in particular, to facilitate printing, painting or adhesion. A lubricant is added to the plastic, particularly to improve the processability thereof. According to the invention, a metal soap-free lubricant is used as a lubricant for the plastic. Alternatively, the wettability and/or the adhesivity of the polyamide surfaces can be improved, especially in order to facilitate printing, painting or adhesion, by increasing the number of end groups of polyamides, optionally maintaining metal soaps as lubricants.

12 Claims, No Drawings

METHOD FOR IMPROVING THE WETTABILITY AND/OR THE ADHESIVITY OF PLASTIC SURFACES, IN PARTICULAR, TO FACILITATE PRINTING

CROSS REFERENCES TO RELATED APPLICATIONS

This application is a National Stage filing of International Application PCT/EP2007/010075, filed Nov. 21, 2007, claiming priority to German Patent Application No. DE 10 2006 055 384.5, filed Nov. 22, 2006. The subject application claims priority to PCT/EP2007/010075 and to German Patent Application No. DE 10 2006 055 384.5 and both references are expressly incorporated by reference herein, in their entirety.

BACKGROUND OF THE INVENTION

This invention concerns methods for improving the wettability and/or the adhesiveness of plastic surfaces, in particular for purposes of improving their ability to be printed, painted or glued, as well as the use of these methods.

Moreover, this invention concerns the use of metal soap-free lubricants in plastic materials to improve wettability and/or adhesiveness of their surfaces, in particular for purposes of improving their ability to be printed, painted or glued.

In general the so-called lubricants, which directly affect the rheology of the plastic melt during processing, are added to plastics, especially thermoplastics, so as to make processing as easy as possible. These lubricants serve both for improved slip of the polymer chains of the plastic over each other and, because of their surface activity, for better dispersion of additives (adjuvants). In addition, lubricants reduce the heat of friction in an extruder and aid in forming an item from an injection molding tool.

Within the scope of this invention in particular additives or adjuvants for filled plastics, especially pressed plastics or injection molding plastics, which make the fillers slip more easily and thus the pressed plastics more easily formable, are called lubricants. The lubricants themselves are insoluble in the plastics to which they are added. For further details concerning the term lubricant one can refer in particular to Römpp's Chemical Lexicon, 10th edition, Georg Thieme Publishers, Stuttgart/New York, Volume 2, 1997, p. 1553, key word: "Lubricant," and the literature cited there, where the content in this regard is hereby incorporated in its full extent by reference.

Hydrophobic metal soaps, especially metal soaps of stearic acid (for example calcium stearate), are often used as so-called internal lubricants in the case of plastics, especially technical polyamides, because of their excellent property profile.

The term "metal soaps," as used within the scope of this invention, means in particular the salts of the metals aluminum, barium, calcium, cadmium, cobalt, chromium, copper, iron, lithium, magnesium, manganese, nickel, lead, tin, strontium and zinc (but not sodium and potassium) with higher fatty, resin, and naphthenic acids (for example, stearates, palmitates, oleates, linoleates, resonates, laurates, octanoates, ricinoleates, 12-hydroxystearates, naphthenates, tallates and the like). For further details concerning the term "metal salts" one can refer to Römpp's Chemical Lexicon, 10th edition, Georg Thieme Publishers, Stuttgart/New York, Volume 4, 1998, p. 2619, "Metal soaps," and the literature cited there, where their disclosure in this regard is hereby incorporated in its full extent by reference.

However, it is known that slip agents that are based on metal soaps tend to have a strong plate-out effect. This means that even during processing, metal soap-based lubricants diffuse onto the surface of the plastics and cause a separating effect there between the plastic surface and a tool wall in contact with the plastic surface. This so-called plate-out effect is due to various degrees of incompatibility of the individual components of the mixture within the plastic mixture.

This is why plastics, before being processed, for example gluing, coating, printing and painting, generally require an activation of the surface, through which activation the wettability or the adhesiveness of the plastic surface for liquid glues, dyes, paints, inks and the like is first enabled. Such pretreatment measures in particular include corona pretreatment, flame pretreatment, chemical pretreatment, plasma pretreatment (for example, by means of a low-pressure plasma), fluoridation, etc.; as a consequence of the oxidation processes that take place the plastic surface becomes polarized. Another form of pretreatment, which is used, for example, in the automobile industry in painting polyamides, is the so-called priming of the substrate or plastic surface with a coupling agent in order to increase the affinity for the subsequent painting.

Plastics have been imprinted in this way for a long time now. For example, for many years polyamides have been printed, for example in screen printing, with light-curable, especially UV-curable inks, and UV-curable ink systems have also been long-established in paper and cardboard printing.

Nevertheless, the plate-out effect of the metal soaps used as lubricants in plastics that was noted above can be harmful for a subsequent printing, for example with a UV-curable ink. These metal soaps, for example metal stearates, also disrupt the printing process by the fact that they react with components of the UV ink system and/or form a barrier layer between the ink and plastic surface and thus diminish the functionality of said ink.

Light-curable inks in general contain one or more photoinitiators that are matched to a predetermined short wavelength of light. The light emitted during curing is chosen in a wavelength such that the photoinitiator is stimulated and the ink becomes at least partially polymerized; polymerization of the ink then leads to an increase of viscosity and to consolidation of the ink, where the degree of consolidation is dependent on the time of exposure and on the emitted radiation power. Current UV-curable inks are based in some cases on a UV light quantum-induced radical polymerization of acrylates (for example methyl methacrylate); acrylates have polar character because of the carboxyl groups that are present and thus have a certain surface tension, which is given in the literature as about 16 mN/m for the polar part. A certain affinity for a polar plastic, for example polar polyamide (surface tension of polar part about 18.1 mN/m) is said to be given by this. However, because of the so-called plate-out effect of the metal soaps that are used as lubricant (for example metal stearates) the surface tension of the plastic surface is reduced and printing is crucially degraded. This appears in a sharp difference of the quality between the "normal" state and the conditioned state. Compared to the "standard," which already behaves qualitatively poorly, conditioned polyamides show a still much poorer contrast and still much poorer abrasion resistance, and these differences of quality are undesirable.

The invention therefore is based on the task of making available a method for improving the wettability and/or the adhesiveness of plastic surfaces (for example polyamide surfaces), in particular for purposes of easier capacity to be printed, painted or glued, which at least largely avoids the disadvantages of the prior art that were listed above or at least diminishes them.

BRIEF SUMMARY

A method for improving the wettability and/or adhesivity of plastic surfaces, in particular, to facilitate printing, painting or adhesion. A lubricant is added to the plastic, particularly to improve the processability thereof. According to the invention, a metal soap-free lubricant is used as a lubricant for the plastic. Alternatively, the wettability and/or the adhesivity of the polyamide surfaces can be improved, especially in order to facilitate printing, painting or adhesion, by increasing the number of end groups of polyamides, optionally maintaining metal soaps as lubricants.

One object of the present disclosure is to describe an improved method for improving the wettability and/or adhesivity of plastic surfaces to facilitate printing, painting or adhesion.

DETAILED DESCRIPTION

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

The applicant surprisingly now found that the wettability and adhesiveness of plastic surfaces and thus their ability to be printed, painted or glued can be considerably improved by adding metal soap-free lubricants to the plastics instead of the otherwise conventional metal soaps.

Thus, the object of the invention is a method for improving the wettability and/or adhesiveness of plastic surfaces (i.e., plastic materials or the surface of plastic materials), in particular to make printing, painting or gluing easier, in which a lubricant is added to the plastic, in particular to improve the processability of the plastic (for example in extrusion, injection molding, etc.), whereby, in accordance with the invention, exclusively at least one metal soap-free lubricant is used as the lubricant for the plastic.

With regard to the terms "metal soaps" and "lubricant," as used in this invention, reference is made to the statements given above.

If, within the scope of this invention, the discussion concerns the addition of a metal soap-free lubricant to the plastic, this term, "metal soap-free lubricant," is understood to mean either a single lubricant or a mixture of such lubricants.

The applicant surprisingly found that through the use of metal soap-free lubricants and thus the complete avoidance of metal soap based lubricants, the so called plate-out effect could be at least largely avoided or minimized so that a problematic barrier layer that might prevent or degrade subsequent printing, painting, dyeing or gluing would not be formed on the plastic surface.

Besides the effect desired in accordance with the invention, namely that the metal soap-free lubricants that are used in accordance with the invention as lubricants, especially those based on fatty acid esters, tend to produce a plate-out effect only to a very small extent or not at all, still other advantageous properties are linked with the use of metal soap-free lubricants: for instance, the fatty acid esters used in accordance with the invention as metal soap-free lubricants are amphipolar, with their hydrophobic character being dominant; in general, they are more polar than metal soaps. Compared to metal soaps, they also do not reduce the surface tension of polyamide surfaces; in contrast, metal soaps lower the surface tension of water and thus, since polyamides accept moisture via the surface, they also lower the surface tension of the polyamide surface. As a result, additional favorable properties of the resulting plastic surfaces are linked with the metal soap-free lubricants that are selected in accordance with the invention.

In particular, an ester of an organic carboxylic acid, preferably a fatty acid, especially preferably a hydrophilic fatty acid or a glyceric acid ester is preferably used as metal soap-free lubricant for the plastic within the scope of this invention.

The term "fatty acids," as used within the scope of this invention is, in particular, a group name for aliphatic, generally saturated carboxylic acids with nearly exclusively unbranched carbon chain. The name goes back to the earlier recognition that the natural fats and oils consist of the esters of long-chain carboxylic acids, especially those with glycerol. Subsequently the generic name of "fatty acids" was extended to all alkanoic acids and their unsaturated representatives ("oleic acids"). For further details concerning the term "fatty acids" one can refer, for example, to Römpp's Chemical Lexicon, 10th edition, Georg Thieme Publishers, Stuttgart/New York, Volume 2, 1997, pp. 1325-1327, key word: "Fatty acids," and the literature cited there.

Within the scope of this invention, particularly fatty acids in which the fatty acid is a higher fatty acid with at least 10 carbon atoms, preferably at least 12 carbon atoms, are used as metal soap-free lubricants. In particular, the fatty acid is the fatty acid ester of a $C_{10}$-$C_{30}$ fatty acid, especially a $C_{12}$-$C_{24}$ fatty acid, preferably a $C_{14}$-$C_{20}$ fatty acid, especially preferably stearic acid.

In particular within the scope of the invention, a fatty acid ester in which the fatty acid is a saturated unbranched fatty acid, especially with at least 10 carbon atoms, preferably with at least 12 carbon atoms, is used as the metal soap-free lubricant. Preferably the fatty acid is the fatty acid ester of a saturated unbranched fatty acid, especially a saturated unbranched $C_{10}$-$C_{30}$ fatty acid, preferably a saturated unbranched $C_{12}$-$C_{24}$ fatty acid, especially preferably a saturated unbranched $C_{14}$-$C_{20}$ fatty acid.

Concerning the alcohol (esterification alcohol) of the organic carboxylic acid ester that is used as metal soap-free lubricant, it is a monohydric or polyhydric alcohol, especially a polyhydric alcohol, preferably a dihydric to tetrahydric alcohol. Preferably in accordance with the invention the esterification alcohol of the organic carboxylic acid ester that is used in accordance with the invention as metal soap-free lubricant is a $C_2$-$C_{10}$ alcohol, especially a $C_3$-$C_6$ alcohol. Butanol, isobutanol, pentanol, hexanol, glycerol, pentaerythritol or trimethylolpropane are especially preferred.

According to one preferred embodiment, the fatty acid ester used is a stearic acid ester, especially butyl stearate, isobutyl stearate, hexyl stearate, glycerol monostearate, glycerol distearate, glycerol tristearate, trimethylolpropane tristearate or pentaerythritol tetrastearate, as well as their mixtures.

The amount of metal soap-free lubricant that can be used within the scope of this invention varies within wide ranges. In particular, the lubricant can be used in amounts of 0.01-10 wt %, especially 0.1-5 wt %, preferably 0.3-3 wt %, with respect to the plastics that are processed with it. Nevertheless, it may be necessary in individual cases or due to application to deviate from said amounts without going beyond the scope of this invention.

The replacement of the hydrophobic metal salts as lubricants by the hydrophilic fatty acid esters (for example hexyl stearate, glyceric acid esters, glycerol monostearate, butyl stearate, etc.) efficiently solves the problem underlying this invention and it does so without preceding costly pretreatment processes. Because of their hydrophilic character and higher molecular weight the metal soap-free lubricants, especially when they are used in polyamides as the plastics, have a lesser tendency toward a plate-out effect when compared to metal soaps, for example calcium stearate. Thus, the negative effect on the polarity of the surface is not as strong as in the case with metal soaps used as lubricants, so that when the plastic surfaces are in either "normal" state or in conditioned state (for example polyamide surfaces) no differences in quality are seen, for example in a printing process with UV ink systems, for example.

In contrast, as the applicant also surprisingly found out, any alternative possibilities of solving the problem underlying this invention, for example the use of calcium carbonates, increased titanium dioxide contents (as white pigment) or the like, do not show any success in that regard.

As a result, the method in accordance with the invention leads to an efficient improvement of the wettability and adhesiveness of plastic surfaces and in this way improves their ability to be printed, painted, glued, etc., and this without costly processes of pretreating the surface of the kind noted above.

The method in accordance with the invention can be applied to a large number of plastics. It is especially suitable for thermoplastics. The term "thermoplastics" open (synonym: "plastomers"), as used within the scope of this invention, indicates in particular polymer materials that are hard or soft at the temperature at which they are used and that have a flow transition region above the temperature of use. In general, thermoplastics consist of linear or branched polymers, which in principle are flowable above the glass transition temperature in the case of amorphous thermoplastics, and above the melting point in the case of crystalline and partially crystalline thermoplastics. In softened state they can be processed into molded articles by compression, extrusion, injection molding or other shaping processes. With regard to further details concerning the term "thermal plastics" one can refer in particular to Römpp's Chemical Lexicon, 10th edition, Georg Thieme Publishers, Stuttgart/New York, Volume 6, 1999, pp. 4505/4506, key word: "Thermoplastics," and the literature cited there, whereby the disclosure in this regard is herewith incorporated in its full extent by reference.

In particular, the plastic in accordance with the invention can be chosen from the group consisting of polyamides, polyolefins, polyurethanes, ABS (acrylonitrile/butadiene/styrene), PBT (polybutylene terephthalate) and PC (polycarbonates). Polyamides are preferred, i.e., the method in accordance with the invention is especially suitable for improving the wettability and/or the adhesiveness of polyamide surfaces; nevertheless it is also basically equally suitable for the other indicated thermoplastics, too.

In addition, the applicant surprisingly found that, according to an alternative embodiment, the problem of improving the wettability and/or the adhesiveness listed above and underlying this invention, in particular for polyamide surfaces, especially for purposes of easier printing, painting or gluing, also can be alleviated by increasing the number of end groups of the polyamide. According to this alternative development, thus a method for improving the wettability and/or the adhesiveness in particular of polyamide surfaces, especially for easier printing, painting or gluing, in which the end group count of the polyamide is increased.

Many polymeric substances have especially reactive or other functional groups at the ends of the chain or branched molecules, which are called end groups; for example, one can refer in this regard to Römpp's Chemical Lexicon, 10th edition, Georg Thieme Publishers, Stuttgart/New York, Volume 2, 1997, p. 1156, key word: "End group determination."

According to this alternative solution of the problem underlying this invention, an improvement of the wettability and/or adhesiveness in particular of polyamide surfaces is achieved without varying the lubricant. With this alternative development it is possible either to add lubricants based on a metal soap, i.e., thereby retaining the metal soaps as lubricants, or as in the case of the first development of the method in accordance with the invention, metal soap-free lubricants are used, as defined above. The negative consequences of the plate-out effect of metal soaps as lubricants is compensated in this alternative development by the higher end-group count of the polyamide. An advantage of this alternative development, which was developed particularly for polyamides, is the possibility of using metal soaps as lubricants, which, in contrast to metal soap-free lubricants, have better processing behavior, especially better internal and external lubricant effects and better properties as separating agents.

In both variations it is achieved in accordance with the invention that a subsequent printing, painting, gluing or dyeing of the plastic surfaces, especially polyamide surfaces, can take place without prior pretreatment, especially without chemical pretreatment, fluoridation, corona treatment, flame treatment, plasma treatment, oxidation, priming or the like.

In particular, the printability of plastic surfaces can be improved with the method in accordance with the invention, especially the printability of plastic surfaces using preferably light-curable, especially UV-curable inks.

In addition, the paintability of plastic surfaces can be improved in an efficient way with the method in accordance with the invention. In particular, the adhesion of paints, dyes and the like on plastic surfaces, or the wettability of plastic surfaces with paints, dyes and the like, is improved through this.

In addition, with the method in accordance with the invention an improvement can also be achieved in the gluability of plastic surfaces. In particular, through this the adhesion of adhesives to plastic surfaces and the wettability of plastic surfaces with adhesives can be increased.

The methods in accordance with the invention in accordance with the first and second alternatives can be employed in a manner that is especially preferred in accordance with the invention for printing plastic surfaces with preferably light-curable, especially UV-curable inks. Printing of the plastic surface can take place inexpensively with an inkjet printer, and this without costly pretreatment of the plastic surface.

Finally, another object of this invention is the use of metal soap-free lubricants in plastics to improve the wettability and/or the adhesiveness of their surface, especially for purposes of improving their ability to be printed, painted or glued. With regard to greater details on the use in accordance with the invention one can refer to the above exclamations concerning the method in accordance with the invention, which are correspondingly valid with regard to the use in accordance with the invention.

Other developments, deviations and variations of this invention are easily recognized and realized by one skilled in the art upon reading the description without going beyond the scope of this invention.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. A method for improving the wettability and adhesiveness of plastic surfaces for purposes of improving their ability to be printed, painted or glued, whereby a lubricant is added to the plastic for better processability,
wherein at least one metal soap-free lubricant is used as lubricant for the plastic,
wherein an ester of an organic carboxylic acid is used as metal soap-free lubricant for the plastic,
wherein the plastic is chosen from the group consisting of polyamides, polyolefins, polyurethanes, ABS (acrylonitrile/butadiene/styreme), and PBT (polybutylene terephthalate), and
wherein a light-curable ink is used without prior pretreatment of the plastic surfaces.

2. A method as in claim 1, characterized by the fact that the ester of an organic carboxylic acid is a fatty acid ester, wherein the fatty acid of the fatty acid ester is a higher fatty acid with at least 10 carbon atoms.

3. A method as in claim 2, characterized by the fact that the fatty acid of the fatty acid ester is a saturated unbranched fatty acid with at least 10 carbon atoms.

4. A method as in claim 1, characterized by the fact that the alcohol of the organic carboxylic acid ester is a monohydric or polyhydric alcohol.

5. A method as in claim 2, characterized by the fact that the fatty acid is a stearic acid ester, butyl stearate, isobutyl stearate, hexyl stearate, glycerol monostearate, glycerol distearate, glycerol tristearate, trimethylolpropane tristearate or pentaerythritol tetrastearate, as well as their mixtures.

6. A method as in claim 1, characterized by the fact that the lubricant is used in amounts from 0.01-10 wt%, with respect to the plastic.

7. A method as in claim 1, characterized by the fact that the plastic surface is produced by means of extrusion or injection molding.

8. A method as in claim 1, characterized in that the subsequent printing, painting or gluing of the plastic surface takes place without prior pretreatment.

9. A method as in claim 1, to improve the paintability of plastic surfaces and to improve the adhesion of paints, dyes and the like to plastic with paints and dyes.

10. A method as in claim 1, to improve the wettability of plastic surfaces with paints and dyes.

11. A method as in claim 1, to improve the gluability of plastic surfaces and to improve the adhesion of adhesives to plastic surfaces.

12. The method of claim 1, wherein the printing of the plastic surface takes place with an inkjet printer.

* * * * *